(12) United States Patent
Woolley et al.

(10) Patent No.: US 10,466,789 B2
(45) Date of Patent: *Nov. 5, 2019

(54) MOVEMENT CAPABILITY FOR BUTTONLESS TOUCHPADS AND FORCEPADS

(71) Applicant: CIRQUE CORPORATION, Salt Lake City, UT (US)

(72) Inventors: Richard D. Woolley, Orem, UT (US); Paul H. Glad, Taylorsville, UT (US)

(73) Assignee: Cirque Corporation, West Valley, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,430

(22) Filed: Jul. 5, 2016

(65) Prior Publication Data

US 2017/0003789 A1 Jan. 5, 2017

Related U.S. Application Data

(60) Provisional application No. 62/188,435, filed on Jul. 2, 2015.

(51) Int. Cl.
| G06F 3/041 | (2006.01) |
| G06F 3/01  | (2006.01) |
| G06F 3/044 | (2006.01) |

(52) U.S. Cl.
CPC .... G06F 3/016 (2013.01); *G06F 2203/04105* (2013.01)

(58) Field of Classification Search
None
See application file for complete search history.

(56) References Cited

U.S. PATENT DOCUMENTS

| 6,027,267 | A | 2/2000 | Yokobori |
| 6,393,165 | B1 | 5/2002 | Yeh |
| 2001/0035854 | A1 | 11/2001 | Rosenberg et al. |
| 2002/0033795 | A1 | 3/2002 | Shahoian et al. |
| 2006/0164400 | A1* | 7/2006 | Sun ............... G06F 3/03547 345/173 |
| 2010/0060568 | A1 | 3/2010 | Fisher et al. |
| 2010/0079404 | A1 | 4/2010 | Degner et al. |
| 2011/0141052 | A1* | 6/2011 | Bernstein .......... G06F 3/016 345/174 |
| 2013/0050099 | A1 | 2/2013 | Hirano et al. |
| 2014/0002113 | A1* | 1/2014 | Schediwy ......... G06F 3/044 324/661 |
| 2014/0139442 | A1* | 5/2014 | Clayton ........ G06F 3/03547 345/173 |
| 2014/0339062 | A1 | 11/2014 | Glad |
| 2015/0227207 | A1* | 8/2015 | Winter ............. G06F 3/016 345/174 |
| 2015/0243457 | A1* | 8/2015 | Niu ................ H01H 23/12 200/339 |

* cited by examiner

*Primary Examiner* — Benjamin C Lee
*Assistant Examiner* — Krishna P Neupane

(57) ABSTRACT

A system and method for enabling an entire touchpad surface to mechanically move if sufficient force is used to press on the touchpad to perform a mouse click function, such as a right click or a left click, when the touchpad is mechanically buttonless, such as a forcepad, in order to provide haptic feedback on a touchpad that otherwise has none.

17 Claims, 4 Drawing Sheets

MOVEMENT CAPABILITY FOR BUTTONLESS TOUCHPADS AND FORCEPADS

BACKGROUND OF THE INVENTION

Field of the Invention

This invention relates generally to touch sensors. Specifically, the invention pertains to a system and method for enabling an entire touchpad surface to mechanically move if sufficient force is used to press on the touchpad to perform a mouse click function, such as a right click or a left click.

Description of Related Art

There are several designs for capacitance sensitive touch sensors which may take advantage of a system and method for providing mechanical movement of a touchpad that is buttonless. It is useful to examine the underlying technology of the touch sensors to better understand how any capacitance sensitive touchpad can take advantage of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

It should be understood that use of the term "touch sensor" throughout this document may be used interchangeably with "forcepad", "buttonless touchpad", "proximity sensor", "touch and proximity sensor", "touch panel", "touchpad" and "touch screen".

Buttonless touchpads and forcepads may be touch sensors that may not provide a user friendly haptic sensation of a mechanical "click" when pressed. While the touch sensors are still able to provide the functionality of the mouse click, they nevertheless may fail to provide tactile feedback that may not be necessary, but which may be desirable to users.

Furthermore, many touch sensors do not allow the user to perform a mechanical click, right or left, at a top portion of the touchpad. This is an inherent design issue due to the mechanical button(s) being mounted at the bottom area of the underside of the touch sensor surface because the touch sensor is hinged near the upper area of the touchpad. It may be that these types of designs allow about 80% of the touch sensor to be used for "clicking" because a mechanical click on the upper 20% of the pad is either not possible or requires excessive force.

There may be some touch sensors that do not allow any mechanical movement, but instead create an "artificial" click-type response using a motor when the user presses anywhere on the touch sensor, such as in a forcepad. There may also be other forcepad designs that create an audible "click" sound as the user presses on a touch sensor which senses mechanical pressure. However, these touch sensor also lack mechanical movement of the touch sensor itself.

BRIEF SUMMARY OF THE INVENTION

In a first embodiment, the present invention is a system and method for enabling an entire touchpad surface to mechanically move if sufficient force is used to press on the touchpad to perform a mouse click function, such as a right click or a left click, when the touchpad is mechanically buttonless, such as a forcepad, in order to provide haptic feedback on a touch sensor that otherwise has none.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
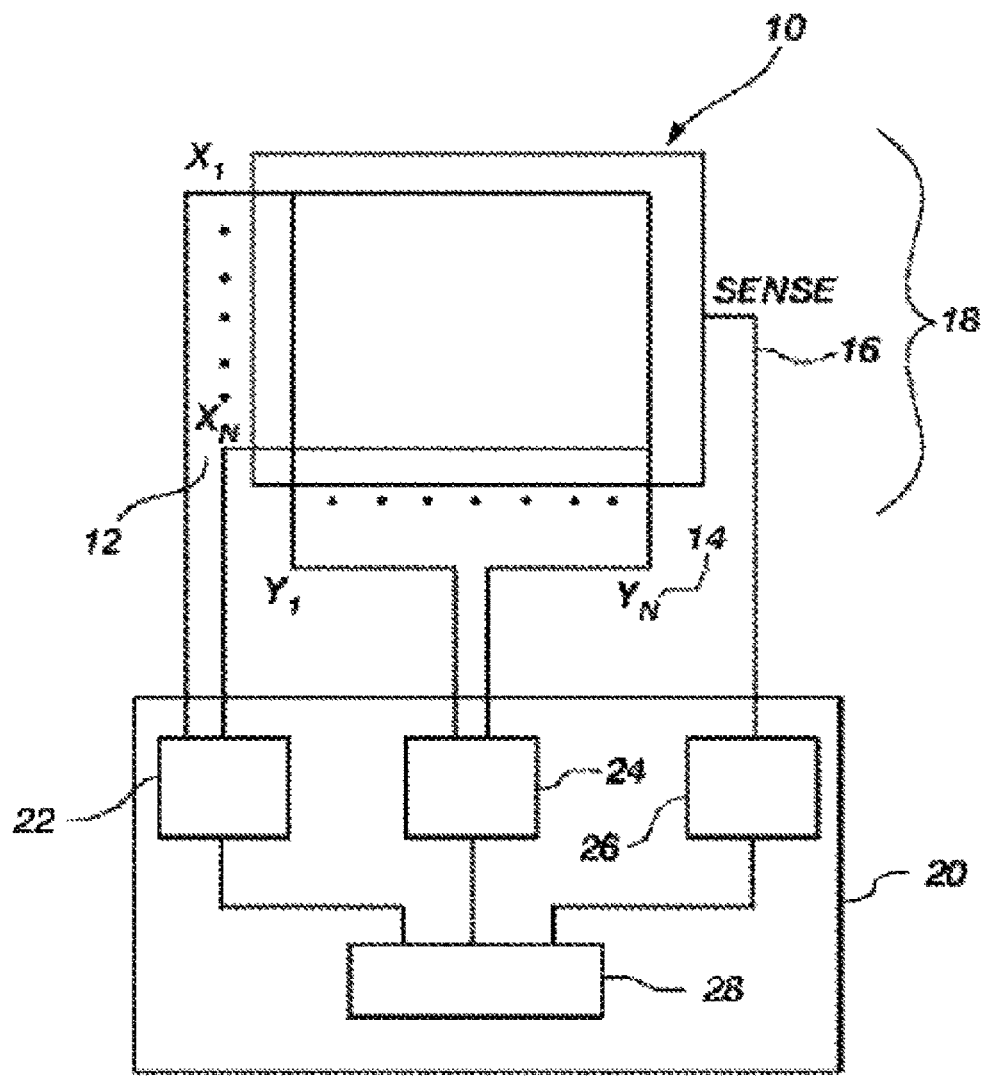
FIG. 1 is a block diagram of operation of a touchpad that is found in the prior art, and which is adaptable for use in the present invention.
Figure 2:
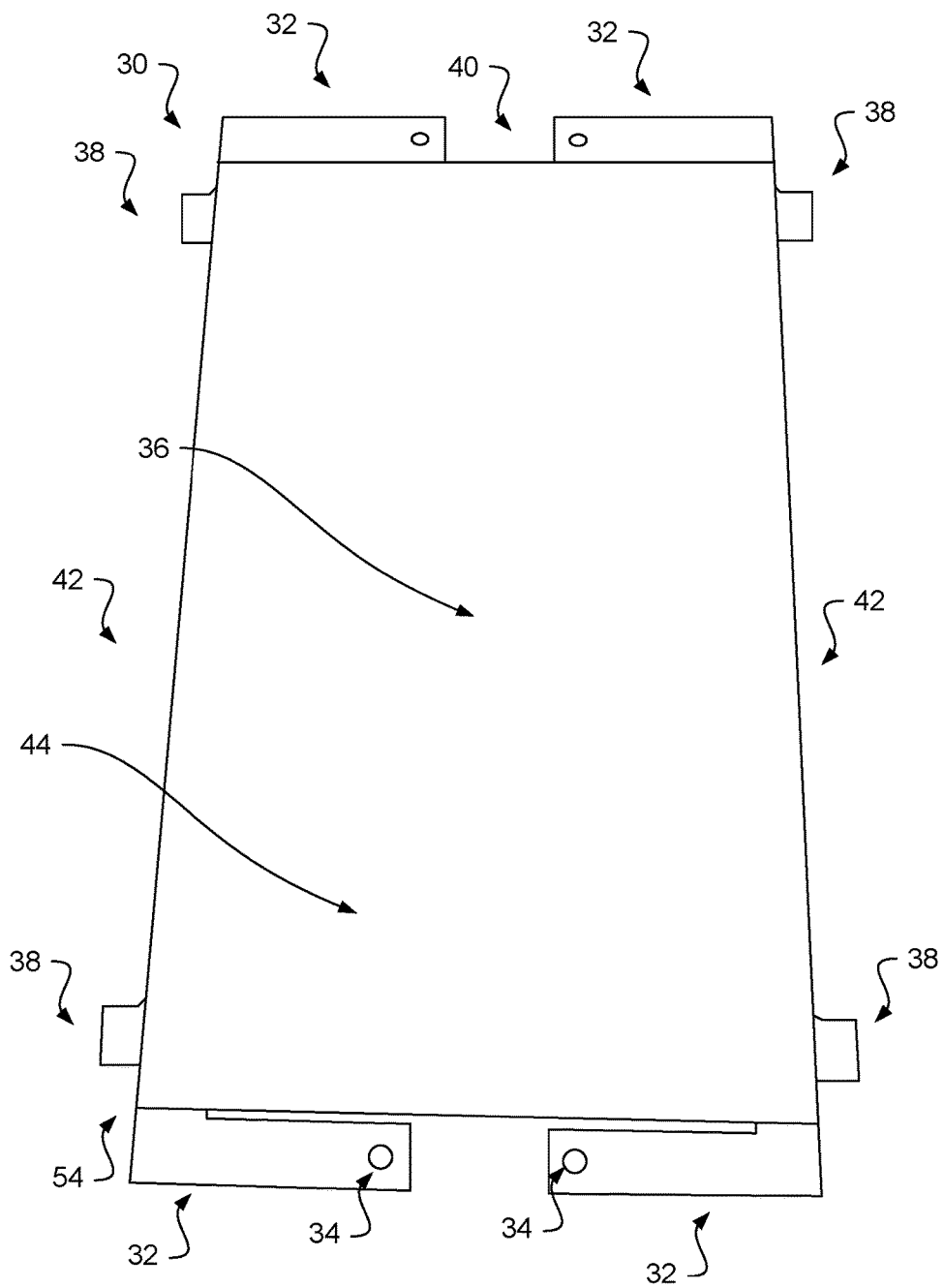
FIG. 2 is a picture of a top view of a substrate and touch sensor disposed thereon, the substrate having four flex arms on each corner of the touch sensor.

FIG. 2 is a picture of a first embodiment of the touch sensor 30. The touch sensor 30 has several features that should be explained. The touch sensor 30 may be disposed on a substrate that is formed as a continuous piece of material. A first feature of the touch sensor 30 may be the four flex arms 32 that may suspend the touch sensor within a housing, not shown. The substrate of the touch sensor 30 may be manufactured from a single sheet of flexible material as shown in this first embodiment. For example, the substrate may be comprised of printed circuit board (PCB). The PCB may be sufficiently flexible to enable the four flex arms 32 to provide the desired mechanical action of the touch sensor 30.

In this first embodiment, the four flex arms 32 are shown with a hole 34 at the distal end of each flex arm. The hole 34 may be used to position and hold the touch sensor 30 in place within a housing. For example, the hole 34 may be positioned over a projection on the housing on which the hole may be positioned. Applying a force to any portion of the sensor portion 36 of the touch sensor 30, may result in the flexing of the four flex arms 32 where the flex arms are attached to the four corners of the touch sensor.

Alternatively, the four flex arms 32 may be mechanically attached to the touch sensor 30 instead of being an integral part of the structure of the touch sensor, and may still provide the flexibility needed for the touch sensor to be mechanically manipulated by a force applied to the touch sensor.

The length of each of the four flex arms 32 may be the same or they may vary. The four flex arms 32 may vary in width and length. The four flex arms may or may not have the hole 34 for positioning.

In this first embodiment, the touch sensor 30 may include four small tabs 38. While the four flex arms 32 may be disposed on the short sides 40 of the touch sensor 30, the tabs 38 may be disposed on the long sides 42 of the touch sensor. The tabs 38 may function to prevent undesired movement of the touch sensor 30. For example, the four tabs 38 may be pivot points that may prevent the touch sensor 30 from lifting out of the housing and to instead assist the touch sensor in moving downward into a depression in the housing when a force is applied to the top surface 44 of the touch sensor.

For example, when pressing on a far left side of the touch sensor 30, the far right side of the touch sensor may try to lift out of the housing. However, if the tabs 38 are actually underneath an edge of the housing, then the housing itself may prevent the touch sensor 30 from lifting out of the housing.

The specific location of the four tabs 38 along the long side 42 may be changed in order to obtain a different depth of movement of the touch sensor 30 when a force is applied to the surface. Accordingly, the position of the four tabs 38 along the long side 42 may be changed in order to achieve different movement characteristics of the touch sensor 30 when a force is applied.

Figure 3:
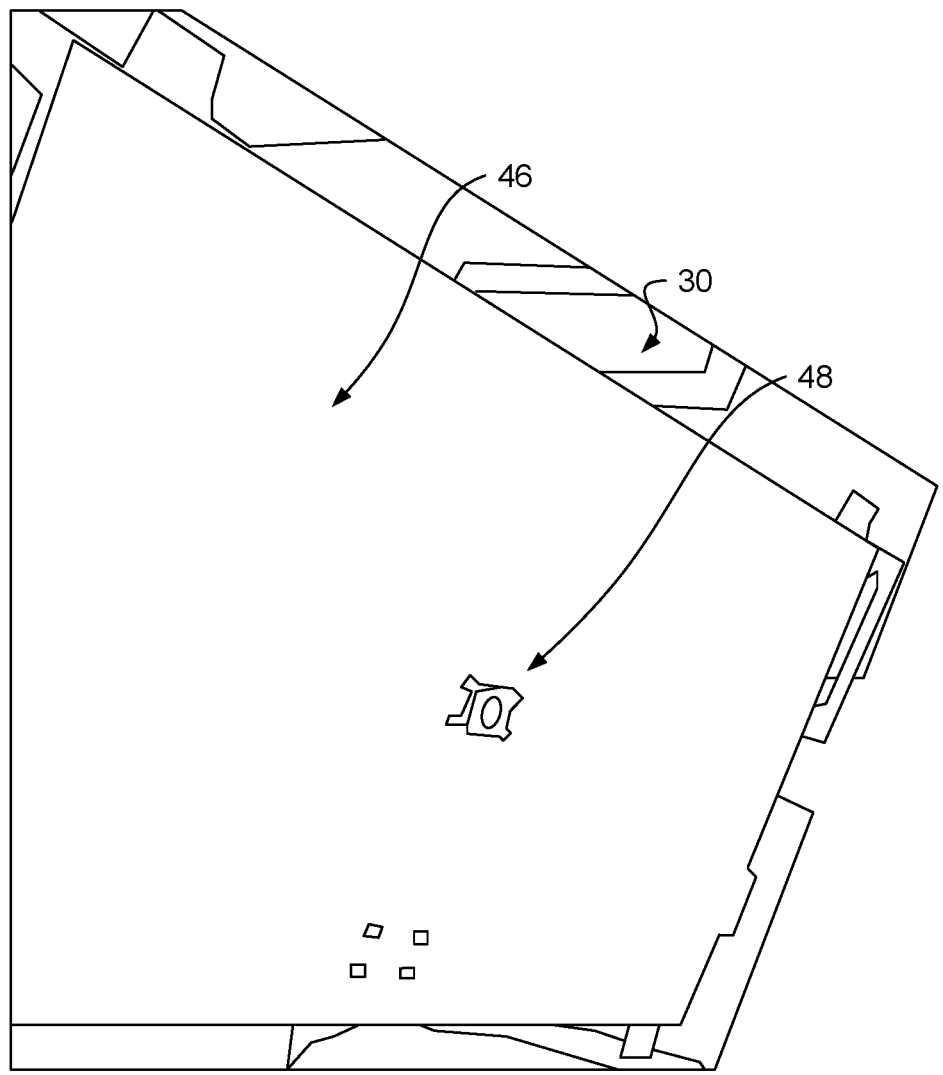
FIG. 3 is a perspective view of the bottom of a substrate showing a mechanical switch disposed in the center of the substrate to provide a mechanical switch when the touch sensor is pressed.

FIG. 3 is a partial perspective view of a bottom surface 46 of the touch sensor 30. In this first embodiment, the bottom surface 46 shows a switch 48 disposed in approximately a center of the touch sensor 30. The switch 48 may provide a mechanical click function. The mechanical click function may be a haptic movement, a clicking sound, or both.

Figure 4:
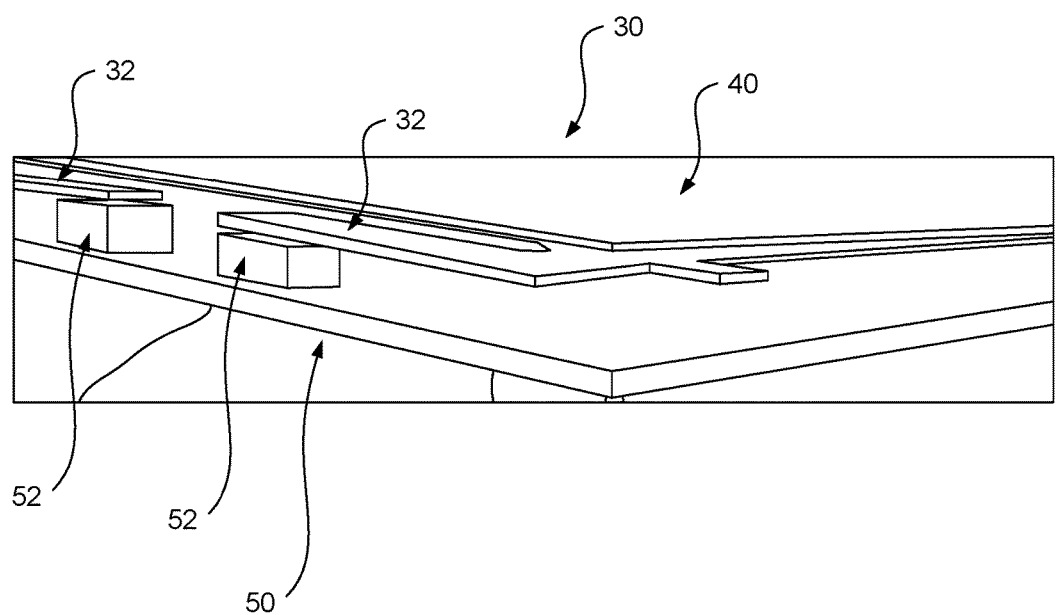
FIG. 4 is a view from an edge of the touch sensor showing that the substrate is only supported by the housing at a distal end of each of the four flex arms.

FIG. 4 is a view of the touch sensor 30 and a supporting structure 50 from a side or edge. The touch sensor 30 is shown as supported by the posts 52 of the supporting structure 50 on the flex arms 32. The flex arms 32 may be the only part of the touch sensor 30 to be in contact with the supporting structure 50. When a force is applied to the top surface 44 of the touch sensor 30, the touch sensor may travel downward, while supported by the four flex arms 32, until the switch 48 on the bottom surface 46 of the touch sensor makes contact with the bottom of a depression in the housing.

One aspect of the first embodiment is that a force may be applied at any location on the top surface 44 of the touch sensor 30 and still cause the entire touch sensor to move in the direction that the force is applied. However, the touch sensor 30 may be tilted so that some areas of the touch sensor moves further than other portions of the touch sensor. Nevertheless, all of the top surface 44 of the touch sensor 30 may move down into the housing as the force is applied. Movement continues until the force is removed or until the center switch 48 makes contact with the housing, preventing further movement of the touch sensor 30.

It is an aspect of the touch sensor 30 that the material used for the touch sensor will be flexible enough so that the touch sensor may return to an unflexed or rest position when the force is not being applied.

One advantage of the first embodiment and the use of four flex arms 32 may be that the stress on the touch sensor 30 at the joint 54 (see FIG. 2) between the touch sensor and the four flex arms may be more evenly distributed across the joints of the touch sensor. Thus, it may be easier to cause the mechanical movement of the touch sensor 30.

While it is desirable to have the joints 54 flex on the touch sensor 30, it may be undesirable to have the top surface 44 of the touch sensor to flex when a force is applied to perform a click function. One advantage of the first embodiment is that a material used to prevent flexing of the surface of the touch sensor 30 may not have to be as rigid if only using only two flex arms 32 because the touch sensor may now move more easily with four flex arms. Alternatively, a thickness of the material used to prevent flexing of the touch sensor 30 may not have to be as thick and thereby increasing sensitivity of the touch sensor.

Another aspect of the first embodiment is that a haptics motor may be used to provide additional movement of the touch sensor 30. The additional movement of the touch sensor 30 may be a function of the amount of force or pressure that is applied to the touch sensor. The haptics motor may therefore provide an additional degree of movement of the touch sensor 30. The haptics motor may be located at any location adjacent to or directly on the touch sensor 30 as needed.

Another aspect of the first embodiment may be a mechanical spring bias feature. The spring bias feature may be used to apply a force to the bottom surface 46 of the touch sensor 30 and hold it away from the housing. The touch sensor 30 may be held within the housing by the four tabs 38.

It is noted that a spring mounting platform may be provided having a ramped surface and an opposing feature that bends the spring to form a preloaded condition. The touch sensor 30 may be pushed against an inside bezel surface of the housing when the touch sensor 30 is at a rest position when no downward force on the top surface 44 is being applied.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for providing mechanical movement of the entire surface of a touch sensor when force is applied, said method comprising:

providing substrate of a touch sensor, the substrate comprising a continuous piece of printed circuit board (PCB) material and forming a rectangular surface having a top long side, a bottom long side, a left short side, a right short side, and a centerline axis extending through the middle of the substrate from the left short side to the right short side, the substrate having a first flex arm manufactured from and comprising the same continuous piece of PCB material as the substrate and having a proximal end at a flexing segment on the left short side near the top long side and extending substantially parallel to the left short side and terminating in a distal end that forms the closest point of the first flex arm to the centerline axis;

providing a second flex arm manufactured from and comprising the same continuous piece of PCB material as the substrate and having a proximal end at a flexing segment on the left short side near the bottom long side and extending substantially parallel to the left short side and terminating in a distal end that forms the closest point of the second flex arm to the centerline axis;

providing a third flex arm manufactured from and comprising the same continuous piece of PCB material as the substrate and having a proximal end at a flexing segment on the right short side near the top long side and extending substantially parallel to the right short side and terminating in a distal end that forms the closest point of the third flex arm to the centerline axis;

providing a fourth flex arm manufactured from and comprising the same continuous piece of PCB material as the substrate and having a proximal end at a flexing segment on the right short side near the bottom long side and extending substantially parallel to the right short side and terminating in a distal end that forms the closest point of the fourth flex arm to the centerline axis;

providing a housing, the housing supporting the substrate at the distal ends of each of the first, second, third, and fourth flex arms;

providing a touch sensor on the surface of the substrate, wherein the touch sensor is a buttonless touch sensor having no mechanical buttons to perform mouse click functions;

responding to a force applied against the rectangular top surface of the touch sensor by causing the top surface of the touch sensor to move within the housing to provide haptic feedback to the user while the substrate is flexing at at least one of the flexing segments of the first, second, third, or fourth flex arms, to thereby provide movement to the buttonless touch sensor.

2. The method as defined in claim 1 wherein the method further comprises the steps of:

providing a mechanical switch on a bottom surface of the substrate, wherein movement of the substrate is stopped when the mechanical switch makes contact with the housing; and providing a mechanical click action when the mechanical switch makes contact with the housing.

3. The method as defined in claim 2 wherein the method further comprises the step of providing an audible sound with the mechanical click action.

4. The method as defined in claim 1 wherein the method further comprises the step of supporting the substrate at each distal end of the first, second, third, and fourth flex arms.

5. The method as defined in claim 1 wherein the method further comprises the step of returning the substrate to a rest position when the force is removed from the top surface of the touch sensor.

6. The method as defined in claim 1 wherein the method further comprises providing a tab on at least one of the top or bottom sides of the substrate.

7. The method as defined in claim 6 wherein the method further comprises the step of preventing flexing of the touch sensor on the substrate by providing a material on the substrate that prevents flexing.

8. The method as defined in claim 7 wherein the method further comprises increasing sensitivity of the touch sensor by reducing a thickness of the material used to prevent flexing of the substrate.

9. The method as defined in claim 1 wherein the method further comprises the step of providing a haptic motor that is coupled to the touch sensor to thereby increase haptic feedback of the touch sensor when a force is applied to the touch sensor that is sufficient to cause the touch sensor to move.

10. A system for providing mechanical movement of the entire surface of a touch sensor when force is applied, said system comprised of:

a substrate of a touch sensor, the substrate comprising a continuous piece of printed circuit board (PCB) material and forming a rectangular surface having a top long side, a bottom long side, a left short side, a right short side, and a centerline axis extending through the middle of the substrate from the left short side to the right short side;

a first flex arm manufactured from and comprising the same continuous piece of PCB material as the substrate and having a proximal end at a flexing segment on the left short side near the top long side and extending substantially parallel to the left short side and terminating in a distal end that forms the closest point of the first flex arm to the centerline axis;

a second flex arm manufactured from and comprising the same continuous piece of PCB material as the substrate and having a proximal end at a flexing segment on the left short side near the bottom long side and extending substantially parallel to the left short side and terminating in a distal end that forms the closest point of the second flex arm to the centerline axis;

a third flex arm manufactured from and comprising the same continuous piece of PCB material as the substrate and having a proximal end at a flexing segment on the right short side near the top long side and extending substantially parallel to the right short side and terminating in a distal end that forms the closest point of the third flex arm to the centerline axis;

a fourth flex arm manufactured from and comprising the same continuous piece of PCB material as the substrate and having a proximal end at a flexing segment on the right short side near the bottom long side and extending substantially parallel to the right short side and terminating in a distal end that forms the closest point of the fourth flex arm to the centerline axis;

a housing of the touch sensor, the housing supporting the substrate at each of the distal ends of the first, second, third, and fourth flex arms; and a touch sensor disposed on the surface of the substrate, wherein the touch sensor is a buttonless touch sensor having no mechanical buttons to perform mouse click functions, and wherein applying a force against the rectangular surface of the touch sensor causes the top surface of the touch sensor to move within the housing to provide haptic feedback to the user while the substrate is flexing at at least one of the flexing segments of the first, second, third, or fourth flex arms, to thereby provide movement to the buttonless touch sensor.

11. The system as defined in claim 10 wherein the system is further comprised of:
    a mechanical switch disposed on a bottom surface of the substrate, wherein movement of the substrate is stopped when the mechanical switch makes contact with the housing; and
    a mechanical click action performed when the mechanical switch makes contact with the housing.

12. The system as defined in claim 11 wherein an audible sound is generated with the mechanical click action.

13. The system as defined in claim 10 further comprising:
    at least one tab integrally formed on the substrate on at least one of the top or bottom sides.

14. The system as defined in claim 10 further comprising:
    a positioning hole in at least one of the distal ends of the first, second, third, or fourth flex arms.

15. The system as defined in claim 14 wherein the system is further comprised of a material on the substrate that prevents flexing.

16. The system as defined in claim 15 wherein the system is further comprised of increasing sensitivity of the touch sensor by reducing a thickness of the material used to prevent flexing of the substrate.

17. The system as defined in claim 10 wherein the system is further comprised of a haptic motor to increase haptic feedback of the touch sensor when a force is applied to the touch sensor that is sufficient to cause the touch sensor to move.

* * * * *